(12) United States Patent
Park et al.

(10) Patent No.: US 10,770,754 B2
(45) Date of Patent: Sep. 8, 2020

(54) ELECTROLYTE FOR LITHIUM-SULFUR BATTERY AND LITHIUM-SULFUR BATTERY COMPRISING SAME

(71) Applicant: LG CHEM, LTD., Seoul (KR)

(72) Inventors: In Tae Park, Daejeon (KR); Sung Won Hong, Daejeon (KR); Charles Kiseok Song, Daejeon (KR); You Hwa Ohk, Daejeon (KR); Doo Kyung Yang, Daejeon (KR); Chang Hoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 107 days.

(21) Appl. No.: 15/758,115

(22) PCT Filed: Jan. 18, 2017

(86) PCT No.: PCT/KR2017/000627
§ 371 (c)(1),
(2) Date: Mar. 7, 2018

(87) PCT Pub. No.: WO2017/135597
PCT Pub. Date: Aug. 10, 2017

(65) Prior Publication Data
US 2018/0248227 A1 Aug. 30, 2018

(30) Foreign Application Priority Data

Feb. 3, 2016 (KR) .................. 10-2016-0013248
Jan. 17, 2017 (KR) .................. 10-2017-0008309

(51) Int. Cl.
*H01M 10/0569* (2010.01)
*H01M 10/054* (2010.01)
(Continued)

(52) U.S. Cl.
CPC ..... *H01M 10/0569* (2013.01); *H01M 10/052* (2013.01); *H01M 10/054* (2013.01);
(Continued)

(58) Field of Classification Search
CPC .......... H01M 10/0569; H01M 10/054; H01M 10/0568; H01M 4/64
See application file for complete search history.

(56) References Cited

U.S. PATENT DOCUMENTS 6,030,720 A 2/2000 Chu et al.
6,218,054 B1 4/2001 Webber
(Continued)

FOREIGN PATENT DOCUMENTS

CN 1333933 A 1/2002
CN 1534822 A 10/2004
(Continued)

OTHER PUBLICATIONS

European Search Report for Appl. No. 17747642.1 dated Jun. 13, 2018.
(Continued)

*Primary Examiner* — Kenneth J Douyette
(74) *Attorney, Agent, or Firm* — Birch, Stewart, Kolasch & Birch, LLP

(57) ABSTRACT

The present invention relates to an electrolyte solution for a lithium-sulfur battery and a lithium-sulfur battery including the same.
The electrolyte solution for a lithium-sulfur battery according to the present invention exhibits excellent stability, and may improve a swelling phenomenon by suppressing gas generation during lithium-sulfur battery operation.

8 Claims, 2 Drawing Sheets

(51) Int. Cl.
*H01M 10/0568* (2010.01)
*H01M 10/052* (2010.01)
*H01M 10/0567* (2010.01)

(52) U.S. Cl.
CPC .... *H01M 10/0568* (2013.01); *H01M 10/0567* (2013.01); *H01M 2300/0028* (2013.01); *H01M 2300/0037* (2013.01)

(56) References Cited

U.S. PATENT DOCUMENTS

| | | | |
|---|---|---|---|
| 2002/0102466 | A1 | 8/2002 | Hwang et al. |
| 2003/0054258 | A1* | 3/2003 | Ito ................. H01M 6/168 429/324 |
| 2004/0191629 | A1 | 9/2004 | Itaya et al. |
| 2005/0147891 | A1 | 7/2005 | Mikhaylik |
| 2005/0156575 | A1 | 7/2005 | Mikhaylik |
| 2005/0175904 | A1 | 8/2005 | Gorkovenko |
| 2008/0187840 | A1 | 8/2008 | Mikhaylik |
| 2009/0269675 | A1 | 10/2009 | Huang |
| 2010/0035146 | A1 | 2/2010 | Fujii et al. |
| 2012/0082903 | A1* | 4/2012 | Zhang ................. C07D 233/60 429/328 |
| 2012/0214070 | A1* | 8/2012 | Yamamoto ............ H01M 4/485 429/231.8 |
| 2012/0244425 | A1 | 9/2012 | Tokuda |
| 2013/0224535 | A1 | 8/2013 | Matsuoka et al. |
| 2014/0023936 | A1 | 1/2014 | Belharouak et al. |
| 2014/0106238 | A1 | 4/2014 | Giroud et al. |
| 2016/0172707 | A1* | 6/2016 | Oh ..................... H01M 4/38 429/144 |
| 2017/0054180 | A1 | 2/2017 | Fukushima et al. |

FOREIGN PATENT DOCUMENTS

| | | |
|---|---|---|
| CN | 1930710 A | 3/2007 |
| CN | 102306836 A | 1/2012 |
| CN | 102484284 A | 5/2012 |
| CN | 103219542 A | 7/2013 |
| CN | 104300173 A | 1/2015 |
| CN | 103378370 B | 5/2015 |
| CN | 105514490 A | 4/2016 |
| CN | 105810997 A | 7/2016 |
| EP | 1 939 971 A1 | 7/2008 |
| EP | 1 714 348 B1 | 5/2010 |
| EP | 2 485 316 A1 | 8/2012 |
| JP | 2001-520447 A | 10/2001 |
| JP | 2005-108724 A | 4/2005 |
| JP | 2007-518229 A | 7/2007 |
| JP | 2007-522638 A | 8/2007 |
| JP | 2011-96643 A | 5/2011 |
| JP | 2013-225496 A | 10/2013 |
| KR | 10-0326467 B1 | 2/2002 |
| KR | 10-2006-0127973 A | 12/2006 |
| KR | 10-2007-0027512 A | 3/2007 |
| KR | 10-2011-0117426 A | 10/2011 |
| KR | 10-1167334 B1 | 7/2012 |
| KR | 10-2012-0090969 A | 8/2012 |
| KR | 10-2013-0073971 A | 7/2013 |
| KR | 10-2014-0051895 A | 5/2014 |
| KR | 10-2015-0038276 A | 4/2015 |
| KR | 10-2015-0050149 A | 5/2015 |
| KR | 10-1548851 B1 | 9/2015 |
| KR | 10-2015-0126129 A | 11/2015 |
| KR | 10-2016-0042525 A | 4/2016 |
| WO | WO 00/36683 A | 6/2000 |
| WO | WO 2005/078851 A1 | 8/2005 |
| WO | WO 2015/166636 A1 | 11/2015 |
| WO | WO-2015-190705 A1 * | 12/2015 ............ H01M 4/505 |

OTHER PUBLICATIONS

International Search Report (PCT/ISA/210) issued in PCT/KR2017/000627, dated May 4, 2017.

Mikhaylik et al., "High Energy Rechargeable Li—S Cells for EV Application. Status, Remaining Problems and Solutions", ECS Transactions, 2010, 25 (35), pp. 23-34.

* cited by examiner

【Figure 1】
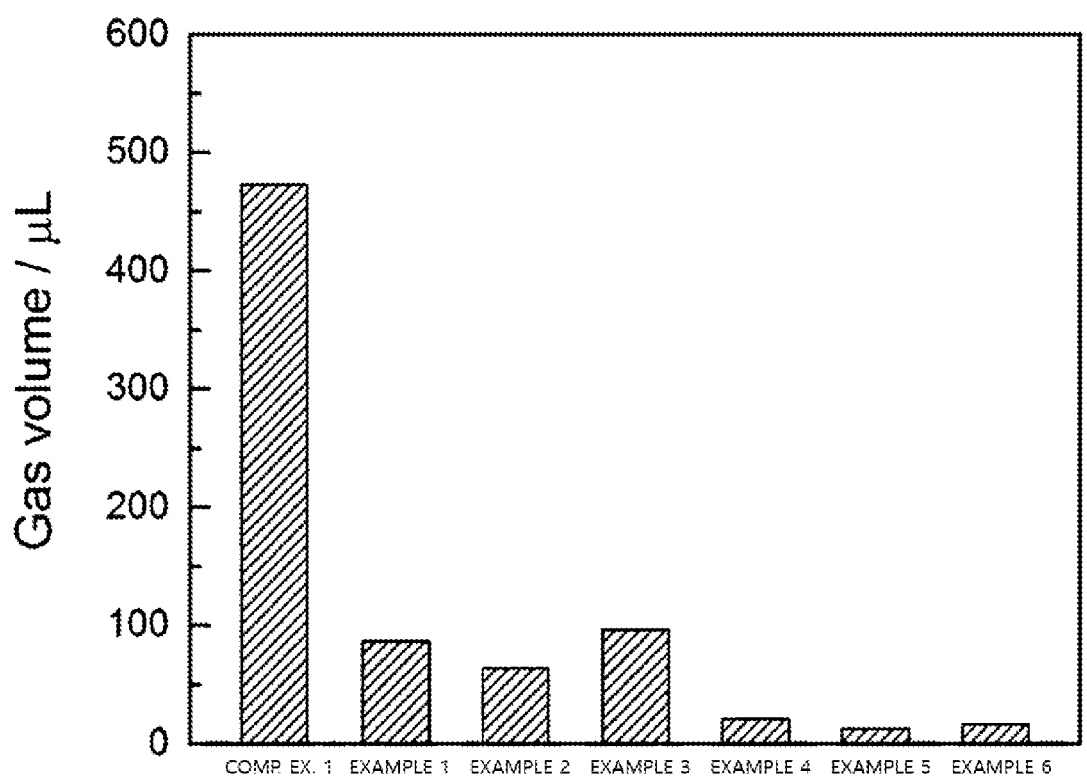

【Figure 2】
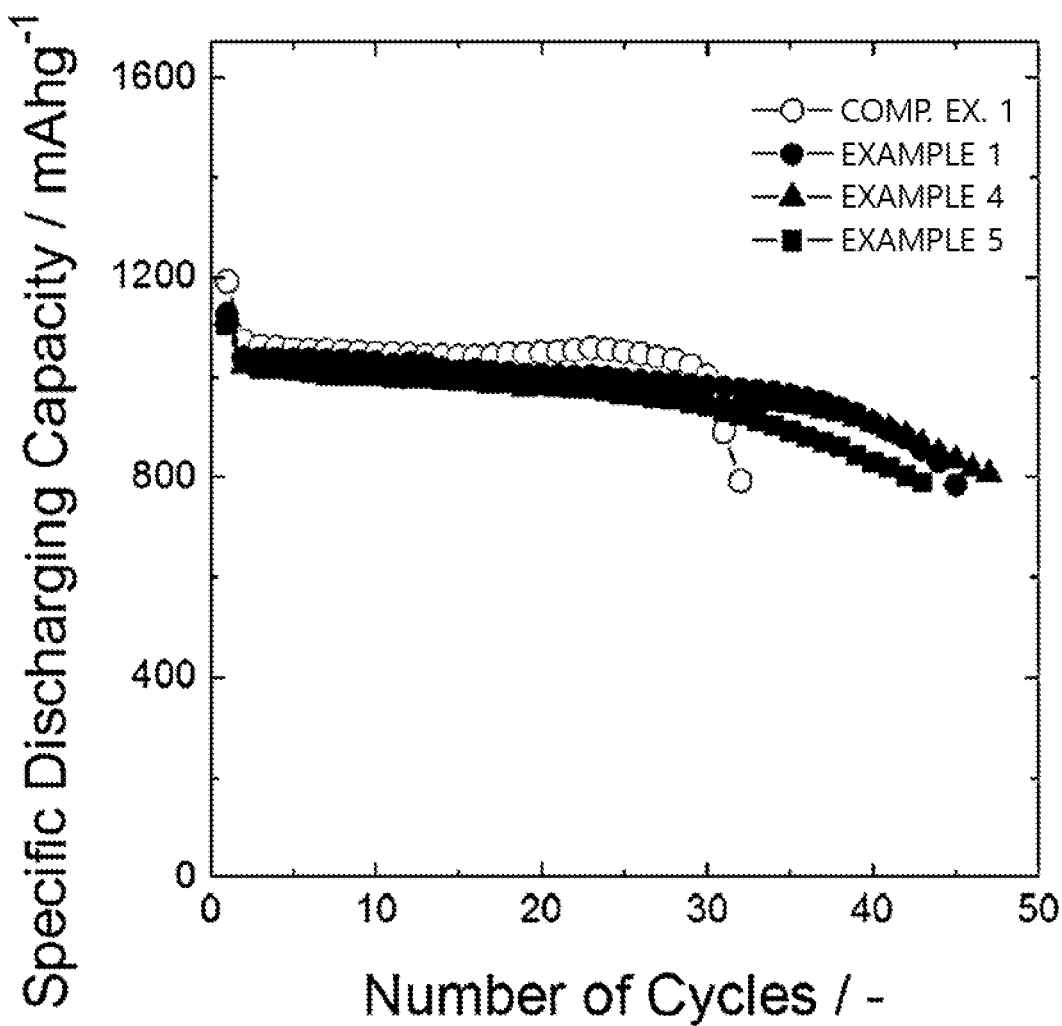

ELECTROLYTE FOR LITHIUM-SULFUR BATTERY AND LITHIUM-SULFUR BATTERY COMPRISING SAME

TECHNICAL FIELD

This application claims priority to and the benefits of Korean Patent Application No. 10-2016-0013248, filed with the Korean Intellectual Property Office on Feb. 3, 2016, and Korean Patent Application No. 10-2017-0008309, filed with the Korean Intellectual Property Office on Jan. 17, 2017, the entire contents of which are incorporated herein by reference.

The present invention relates to an electrolyte solution for a lithium-sulfur battery and a lithium-sulfur battery including the same.

BACKGROUND ART

With recent development of portable electronic devices, electric vehicles and large capacity power storage systems, demands for large capacity batteries have arisen. A lithium-sulfur battery is a secondary battery using a sulfur series material having sulfur-sulfur bonds (S—S bonds) as a positive electrode active material and using lithium metal as a negative electrode active material, and sulfur, a main material of a positive electrode active material, has advantages of being very abundant in resources, having no toxicity and having a low atomic weight.

In addition, a lithium-sulfur battery has theoretical discharge capacity of 1672 mAh/g-sulfur and theoretical energy density of 2,600 Wh/kg, which is very high compared to theoretical energy density of other battery systems currently studied (Ni-MH battery: 450 Wh/kg, Li—FeS battery: 480 Wh/kg, Li—$MnO_2$ battery: 1,000 Wh/kg, Na—S battery: 800 Wh/kg), and therefore, has received attention as a battery having a high energy density property.

However, a lithium-sulfur battery has not been commercialized so far due to a low sulfur utilization rate and thereby failing to secure sufficient capacity as theoretical capacity, and a battery short circuit problem caused by dendrite formation of a lithium metal electrode. In view of the above, positive electrode materials having increased sulfur impregnation, electrolyte solution capable of increasing a sulfur utilization rate, and the like have been developed in order to resolve such problems.

As an electrolyte solvent of a lithium-sulfur battery, a mixed solvent of 1,3-dioxolane (DOL) and 1,2-dimethoxyethane (DME) has been currently used most often. An electrolyte solution using the solvent has excellent properties in terms of a sulfur utilization rate. However, from experimental results of the inventors of the present invention, a swelling phenomenon, in which gas is generated inside and the battery swells up while operating the battery using the electrolyte solution, was observed. Such a swelling phenomenon causes electrolyte solution depletion and battery deformation, and also causes active material deintercalation from electrodes resulting in a problem of declining battery performance.

Causes and generation mechanism of such a swelling phenomenon caused by gas generation inside a battery have not yet been identified, and accordingly, there are no countermeasures as well.

PRIOR ART DOCUMENTS

U.S. Pat. No. 6,218,054, Dioxolane and dimethoxyethane electrolyte solvent system

DISCLOSURE

Technical Problem

In view of the above, the inventors of the present invention have studied electrolyte solvent compositions of a lithium-sulfur battery, and as a result, have completed the present invention.

Accordingly, an aspect of the present invention provides an electrolyte solution for a lithium-sulfur battery significantly reducing an amount of gas generation during battery operation.

Another aspect of the present invention provides a lithium-sulfur battery including the electrolyte solution.

Technical Solution

According to an aspect of the present invention, there is provided an electrolyte solution for a lithium-sulfur battery including a lithium salt and a non-aqueous solvent, wherein the non-aqueous solvent includes cyclic ether including one oxygen in a molecular structure; and linear ether represented by the following Chemical Formula 1:

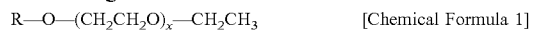

R—O—$(CH_2CH_2O)_x$—$CH_2CH_3$      [Chemical Formula 1]

(In Chemical Formula 1, R and x are the same as described in the specification.)

Herein, the cyclic ether may be 5-membered to 7-membered cyclic ether unsubstituted or substituted with a C1 to C4 alkyl group or alkoxy group, and may be preferably tetrahydrofuran or tetrahydropyran unsubstituted or substituted with a C1 to C4 alkyl group or alkoxy group.

Herein, the R in Chemical Formula 1 may be methyl, ethyl, propyl, isopropyl or butyl.

Herein, a volume ratio of the cyclic ether and linear ether may be from 5:95 to 95:5, and preferably from 30:70 to 70:30.

Herein, the lithium salt may be one type selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, chloroborane lithium, lower aliphatic carboxylic acid lithium, lithium tetraphenylborate, lithium imide and combinations thereof.

The electrolyte solution of the present invention may further include an additive having N—O bonds in a molecule.

Herein, the additive may be one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide and tetramethylpiperidinyloxyl.

Herein, the additive may be included in 0.01% to 10% by weight based on 100% by weight of the electrolyte solution.

According to another aspect of the present invention, there is provided a lithium-sulfur battery including the electrolyte solution.

Advantageous Effects

An electrolyte solution for a lithium-sulfur battery according to the present invention has excellent stability and has a significantly small amount of gas generation during battery operation. As a result, a swelling phenomenon of a battery can be improved.

DESCRIPTION OF DRAWINGS

FIG. 1 is a graph showing amounts gas generation of Experimental Example 1.

FIG. 2 is a graph comparing battery life time properties of Experimental Example 2.

BEST MODE

Hereinafter, embodiments of the present invention will be described in detail with reference to accompanying drawings so that those skilled in the art may readily implement the present invention. However, the present invention may be implemented in various different forms, and is not limited to the examples described herein.

Electrolyte Solution for Lithium-Sulfur Battery

In order to improve a swelling phenomenon caused by gas such as hydrogen generated during lithium-sulfur battery operation, the present invention provides an electrolyte solution for a lithium-sulfur battery including cyclic ether including one oxygen in the molecular structure and linear ether represented by the following Chemical Formula 1 as an electrolyte solvent.

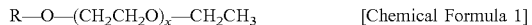

[Chemical Formula 1]

(In Chemical Formula 1, R is a C1 to C6 alkyl group or a C6 to C12 aryl group, and x is 1 or 2.)

A solvent currently used most widely as an electrolyte solvent of a lithium-sulfur battery is a mixed solvent of 1,3-dioxolane (DOL) and 1,2-dimethoxyehane (DME). Using a mixed solvent of DOL and DME enhances a sulfur utilization rate, and excellent results are obtained in terms of battery capacity.

When used in small batteries, an electrolyte solution using the mixed solvent generally exhibits superior performance in terms of battery capacity, battery life time and battery efficiency, however, when used in large batteries such as large area pouch cells, gas such as hydrogen, methane and ethene is generated in considerable amounts inside the battery during battery operation, and a swelling phenomenon by which the battery is swollen is observed.

The present invention has been made in view of the above, and the electrolyte solution of the present invention exhibits improved stability by including the cyclic ether solvent and the linear ether solvent in a specific content ratio, and when used in a lithium-sulfur battery, generation of gas such as hydrogen is significantly reduced during battery operation. As shown in the following experimental examples, the electrolyte solution of the present invention has, when used in a lithium-sulfur battery, gas generation inside the battery measured after battery operation in the amount of 300 μL or less and preferably 100 μL or less. Herein, the value being smaller means less amount of gas generation, and such a decrease in the gas generation is a value with almost no swelling phenomenon of battery swelling up, and a value insignificantly affecting battery stability even when the swelling phenomenon occurs. In other words, when comparing with gas generation of approximately 500 μL in a different electrolyte solution used in the art (refer to Comparative Example 1), the amount of gas generation is significantly low when using the electrolyte solution provided in the present invention, and accordingly, battery stability may be enhanced, and problems of battery performance decline caused by a swelling phenomenon and quality decline caused by battery deformation may be overcome.

Examples of the C1 to C6 alkyl group mentioned in the present specification may include a methyl group, an ethyl group, a propyl group, a butyl group, a pentyl group, a hexyl group or isomers thereof. Herein, the isomers include both structural isomers having the same number of carbons but having a different carbon bonding relation and steric isomers having a difference in the geometric positions of bonds.

In addition, examples of the C6 to C12 aryl group mentioned in the present specification may include a phenyl group or a naphthyl group unsubstituted or substituted with a C1 to C6 alkyl group.

The cyclic ether including one oxygen in a molecular structure is 5-membered or higher cyclic ether unsubstituted or substituted with an alkyl group, and preferably 5-membered to 7-membered cyclic ether unsubstituted or substituted with a C1 to C4 alkyl group or alkoxy group, and more preferably tetrahydrofuran or tetrahydropyran unsubstituted or substituted with a C1 to C4 alkyl group or alkoxy group. Nonlimiting examples thereof may include tetrahydrofuran, 2-methyltetrahydrofuran, 3-methyltetrahydrofuran, 2,3-dimethyltetrahydrofuran, 2,4-dimethyltetrahydrofuran, 2,5-dimethyltetrahydrofuran, 2-methoxytetrahydrofuran, 3-methoxytetrahydrofuran, 2-ethoxytetrahydrofuran, 3-ethoxytetrahydrofuran, tetrahydropyran, 2-methyltetrahydropyran, 3-methyltetrahydropyran, 4-methyltetrahydropyran and the like. The cyclic ether has low viscosity and thereby has favorable ion mobility, and also has high oxidation-reduction stability, and therefore, exhibits high stability even when operating a battery for a long period of time.

In addition, the linear ether is an ethylene glycol-based derivative, and has a structure with ethylene glycol or diethylene glycol as a basic skeleton and linking an ethyl group to one side end thereof through an ether bond. Preferably, R is methyl, ethyl, propyl, isopropyl or butyl. The linear ether is considered to contribute to an electrolyte solution stability during battery operation by having at least one ethoxy group.

The volume ratio of the cyclic ether and the linear ether is from 5:95 to 95:5 and preferably from 30:70 to 70:30. When the volume ratio is outside the above-mentioned range, target effects may not be obtained since an effect of suppressing gas generation during battery operation is insignificant, and therefore, the ratio is properly controlled within the above-mentioned range.

The electrolyte solution of the present invention includes a lithium salt added to an electrolyte solution for increasing ion conductivity. The lithium salt is not particularly limited in the present invention, and those that may be commonly used in lithium secondary batteries may be used without limit. Specifically, the lithium salt may be one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof, and is preferably (CF$_3$SO$_2$)$_2$NLi.

The concentration of the lithium salt may be determined considering ion conductivity and the like, and is preferably from 0.1 M to 4.0 M, or 0.5 M to 2.0 M. When the lithium salt concentration is less than the above-mentioned range, ion conductivity suitable for battery operation is difficult to secure, and when the concentration is greater than above-mentioned range, lithium ion mobility may decrease due to increase in viscosity of the electrolyte solution, and battery performance may decline due to an increase in the decomposition reaction of the lithium salt itself, and therefore, the concentration is properly controlled within the above-mentioned range.

The non-aqueous electrolyte solution for a lithium-sulfur battery of the present invention may further include an additive having N—O bonds in the molecule. The additive is effective in forming a stable film on a lithium electrode and greatly enhancing charge and discharge efficiency. Such an additive may be a nitrate- or nitrite-based compound, a nitro compound and the like. As one example, one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide, and tetramethylpiperidinyloxyl may be used. According to one example of the present invention, lithium nitrate ($LiNO_3$) may be used.

The additive is used in a range of 0.01% to 10% by weight and preferably 0.1% to 5% by weight in 100% by weight of the whole electrolyte solution composition. When the content is less than the above-mentioned range, the above-mentioned effects may not be secured, and when the content is greater than the above-mentioned range, resistance may increase due to the film, and therefore, the content is properly controlled within the above-mentioned range.

As described above, the electrolyte solution for a lithium-sulfur battery according to the present invention uses a mixed solvent of cyclic ether and linear ether as the solvent for securing electrolyte solution stability, and accordingly, gas generation in a battery may be suppressed during charge and discharge without declining battery performance, and a swelling phenomenon may be improved.

A method for preparing the electrolyte solution according to the present invention is not particularly limited in the present invention, and common methods known in the art may be used.

Lithium-Sulfur Battery

A lithium-sulfur battery according to the present invention includes a positive electrode, a negative electrode, a separator interposed therebetween, and an electrolyte solution, and as the electrolyte solution, the non-aqueous electrolyte solution for a lithium-sulfur battery according to the present invention is used.

The lithium-sulfur battery according to the present invention has significantly reduced generation of gas such as hydrogen gas during operation, and may improve a problem of battery performance decline caused by active material deintercalation from electrodes and quality decline caused by battery deformation.

The constitution of the positive electrode, the negative electrode and the separator of the lithium-sulfur battery is not particularly limited in the present invention, and may follow constitutions known in the art.

Positive Electrode

The positive electrode according to the present invention includes a positive electrode active material formed on a positive electrode current collector.

As the positive electrode current collector, those capable of being used as a current collector in the art may all be used, and specifically, foamed aluminum, foamed nickel or the like having excellent conductivity may be preferably used.

The positive electrode active material may include elemental sulfur (S8), sulfur series compounds or mixtures thereof. The sulfur series compound may specifically be $Li_2S_n$ ($n \geq 1$), an organosulfur compound, a carbon-sulfur polymer ($(C_2S_x)_n$: x=2.5 to 50, $n \geq 2$) or the like. These may be used as a composite with a conductor.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The positive electrode may further include a binder for binding of the positive electrode active material and the conductor and for binding on the current collector. The binder may include a thermoplastic resin or a thermosetting resin. For example, polyethylene, polyethylene oxide, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic acid copolymer and the like may be used either alone or as a mixture, however, the binder is not limited thereto, and those capable of being used as a binder in the art may all be used.

Such a positive electrode may be prepared using common methods, and specifically, may be prepared by coating a composition for forming a positive electrode active material layer prepared by mixing a positive electrode active material, a conductor and a binder in an organic solvent on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, acetonitrile, methanol, ethanol, tetrahydrofuran, water, isopropyl alcohol and the like may be included.

Negative Electrode

The negative electrode according to the present invention includes a negative electrode active material formed on a negative electrode current collector.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

As the negative electrode active material, a material capable of reversibly intercalating or deintercalating lithium ions (Li$^+$), a material capable of reversibly forming a lithium-containing compound by reacting with lithium ions, lithium metal or a lithium alloy may be used. Examples of the material capable of reversibly intercalating or deintercalating lithium ions (Li$^+$) may include crystalline carbon, amorphous carbon or a mixture thereof. Examples of the material capable of reversibly forming a lithium-containing compound by reacting with lithium ions (Li$^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The negative electrode may further include a binder for binding of the negative electrode active material and the conductor and for binding on the current collector, and specifically, the binder is the same as the binder of the positive electrode described above.

In addition, the negative electrode may be lithium metal or a lithium alloy. As nonlimiting examples, the negative electrode may be a thin film of lithium metal, or may be an alloy of lithium and one or more types of metals selected from the group consisting of Na, K, Rb, Cs, Fr, Be, Mg, Ca, Sr, Ba, Ra, Al and Sn.

Separator

A common separator may be interposed between the positive electrode and the negative electrode. The separator is a physical separator having a function of physically separating electrodes, and those commonly used as a separator may be used without particular limit, and particularly, those having an excellent electrolyte moisture retention ability while having low resistance for ion migration of the electrolyte solution are preferred.

In addition, the separator enables lithium ion transfer between the positive electrode and the negative electrode while separating or insulating the positive electrode and the negative electrode from each other. Such a separator may be formed with porous, and non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The positive electrode, the negative electrode and the separator included in the lithium-sulfur battery may each be prepared using common components and preparation methods, and although not particularly limited thereto, appearances of the lithium-sulfur battery may include a cylinder-type, a square-type, a pouch-type, a coin-type using a can, and the like.

Hereinafter, preferred examples are provided in order to illuminate the present invention, however, the following examples are for illustrative purposes only, and it is obvious to those skilled in the art that various changes and modifications may be made within the scope and technological ideas of the present invention, and such changes and modifications also belong to the attached claims.

EXAMPLE

Examples 1 to 6 and Comparative Example 1

(1) Preparation of Electrolyte Solution

Non-aqueous electrolyte solutions of Examples 1 to 6 and Comparative Example 1 were prepared in the compositions of the following Table 1. Solvents used herein are as follows (v/v means a volume ratio).
THF: tetrahydrofuran
THP: tetrahydropyran
EGEME: ethylene glycol ethylmethyl ether
EGDEE: ethylene glycol diethyl ether
DOL: 1,3-dioxolane
DME: 1,2-dimethoxyethane

TABLE 1

| | Solvent | Lithium Salt | Additive |
|---|---|---|---|
| Example 1 | THF:EGEME (1:1, v/v) | LiTFSI (1.0M) | LiNO$_3$ |
| Example 2 | THF:EGEME (7:3, v/v) | | (1% by |
| Example 3 | THF:EGEME (3:7, v/v) | | Weight) |
| Example 4 | THF:EGDEE (1:1, v/v) | | |
| Example 5 | THP:EGDEE (1:1, v/v) | | |
| Example 6 | THP:EGDEE (1:1, v/v) | LiPF$_6$ (1.0M) | |
| Comparative Example 1 | DOL:DME (1:1, v/v) | LiTFSI (1.0M) | |

(2) Manufacture of Lithium-Sulfur Battery

65% by weight of sulfur, 25% by weight of carbon black, and 10% by weight of polyethylene oxide were mixed with acetonitrile to prepare a positive electrode active material. The positive electrode active material was coated on an aluminum current collector, and the result was dried to prepare a positive electrode having a size of 30 mm$^2$×50 mm$^2$ and a loading amount of 5 mAh/cm$^2$. In addition, lithium metal having a thickness of 150 μm was employed as a negative electrode.

The prepared positive electrode and the negative electrode were placed to face each other, and a polyethylene separator was interposed therebetween, and each of the electrolyte solutions of (1) was injected thereto.

Experimental Example 1: Manufacture of Lithium-Sulfur Battery and Analysis on Amount of Gas Generation after Charge and Discharge Each of the lithium-sulfur batteries of the examples and the comparative example was charged and discharged 5 times with a C-rate of 0.1 C at 25° C., and then the amount of gas generation inside the battery was measured. The results are shown in the following Table 2 and FIG. 1.

As shown in the following Table 2, Examples 1 to 6 had gas generation of 12.7 μL to 86.5 μL, which were identified to be significantly reduced compared to 473 μL of Comparative Example 1.

TABLE 2

| | Solvent | Lithium Salt | Additive | Amount of Gas Generation (μL) |
|---|---|---|---|---|
| Example 1 | THF:EGEME (1:1, v/v) | LiTFSI (1.0M) | LiNO$_3$ (1% by | 86.5 |
| Example 2 | THF:EGEME (7:3, v/v) | | | 63.6 |

TABLE 2-continued

| | Solvent | Lithium Salt | Additive | Amount of Gas Generation (μL) |
|---|---|---|---|---|
| | | | Weight) | |
| Example 3 | THF:EGEME (3:7, v/v) | | | 96.4 |
| Example 4 | THF:EGDEE (1:1, v/v) | | | 21.1 |
| Example 5 | THP:EGDEE (1:1, v/v) | | | 12.7 |
| Example 6 | THP:EGDEE (1:1, v/v) | LiPF$_6$ (1.0M) | | 15.9 |
| Comparative Example 1 | DOL:DME (1:1, v/v) | LiTFSI (1.0M) | | 473 |

Experimental Example 2: Evaluation on Battery Life Time Property

For each of the batteries of Examples 1, 4, 5 and Comparative Example 1, a capacity retention rate of the battery was measured while charging and discharging under the following condition, and the results are shown in FIG. 2.

Charge: C-rate of 0.1 C, voltage of 2.8 V, CC/CV (5% current cut at 0.1 C)

Discharge: C-rate of 0.1 C, voltage of 1.5 V, CC

As shown in FIG. 2, Examples 1, 4 and 5 exhibited a significantly improved capacity retention rate compared to Comparative Example 1. From the experimental results, it was identified that the electrolyte solution of the present invention had a significantly reduced amount of gas generation and may prevent a battery swelling phenomenon, and may enhance a life time property of a lithium-sulfur battery.

The invention claimed is:

1. A lithium-sulfur battery comprising a positive electrode, a negative electrode, a separator interposed between the positive electrode and the negative electrode, and an electrolyte solution, wherein the electrolyte solution comprises:
   a lithium salt; and
   a non-aqueous solvent,
   wherein the non-aqueous solvent is a mixture of a cyclic ether including one oxygen in a cyclic structure; and
   a linear ether represented by the following Chemical Formula 1:

R—O—(CH$_2$CH$_2$O)$_x$—CH$_2$CH$_3$ wherein:
   R is methyl, ethyl, propyl, isopropyl or butyl; and
   x is 1, and
   wherein the cyclic ether is tetrahydrofuran or tetrahydropyran unsubstituted or substituted with a C1 to C4 alkyl group or alkoxy group.

2. A lithium-sulfur battery of claim 1, wherein the lithium salt includes one type selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiC$_4$BO$_8$, LiAsF$_6$, LiSbF$_6$, LiAlCl$_4$, CH$_3$SO$_3$Li, CF$_3$SO$_3$Li, (CF$_3$SO$_2$)$_2$NLi, (C$_2$F$_5$SO$_2$)$_2$NLi, (SO$_2$F)$_2$NLi, (CF$_3$SO$_2$)$_3$CLi, chloroborane lithium, lower aliphatic carboxylic acid lithium, lithium tetraphenylborate, lithium imide and combinations thereof.

3. A lithium-sulfur battery of claim 1, wherein the lithium salt is included in a concentration of 0.1 M to 4.0 M.

4. A lithium-sulfur battery of claim 1, further comprising an additive having N—O bonds in a molecule.

5. A lithium-sulfur battery of claim 4, wherein the additive is one or more types selected from the group consisting of lithium nitrate, potassium nitrate, cesium nitrate, barium nitrate, ammonium nitrate, lithium nitrite, potassium nitrite, cesium nitrite, ammonium nitrite, methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene, dinitrotoluene, pyridine N-oxide, alkylpyridine N-oxide and tetramethylpiperidinyloxyl.

6. A lithium-sulfur battery of claim 4, wherein the additive is included in 0.01% to 10% by weight based on 100% by weight of the electrolyte solution.

7. A lithium-sulfur battery of claim 1, wherein a volume ratio of the cyclic ether and the linear ether is from 5:95 to 95:5.

8. A lithium-sulfur battery of claim 1, wherein a volume ratio of the cyclic ether and the linear ether is from 30:70 to 70:30.

* * * * *